United States Patent [19]

Bhargava

[11] 4,256,574
[45] Mar. 17, 1981

[54] OZONE DISINFECTION SYSTEM

[75] Inventor: Pankaj Bhargava, Schaumburg, Ill.

[73] Assignee: Sterling Drug Inc., New York, N.Y.

[21] Appl. No.: 74,791

[22] Filed: Sep. 12, 1979

[51] Int. Cl.$^3$ .............................. C02F 1/78; C02F 3/26
[52] U.S. Cl. .................... 210/614; 210/96.1; 210/195.1; 210/760; 210/621
[58] Field of Search ........................ 210/3, 7, 18, 63 Z, 210/60, 15, 96.1, 192, 195.1, 199, 201, 205, 209, 218, DIG. 28

[56] References Cited

U.S. PATENT DOCUMENTS

| | | | |
|---|---|---|---|
| 3,660,277 | 5/1972 | McWhirter et al. | 210/7 X |
| 3,748,262 | 7/1973 | Lee et al. | 210/63 Z |
| 3,945,918 | 3/1976 | Kirk | 210/63 Z |
| 4,132,637 | 1/1979 | Key et al. | 210/18 X |

Primary Examiner—Thomas G. Wyse
Attorney, Agent, or Firm—Dressler, Goldsmith, Shore, Sutker & Milnamow, Ltd.

[57] ABSTRACT

A process is provided for the biological treatment of aqueous waste in a pure oxygen activated sludge/ozone disinfection system as well as apparatus to accomplish the process.

In this process, the off-gas from an ozone disinfection tank, after removal of residual ozone, is blended with the pure oxygen stream needed to supply the requirements of activated sludge treatment basin and ozonation zone. This blending of two streams is carried out either in pipe line or in a specially built (and baffled) vessel. The combined stream is then compressed and split into two portions. One portion of the gas is diverted to the activated sludge treatment plant. The rest of the gas is dried to a dew point level and then fed to ozone generator. The discharge from the ozone generator contains a small percentage of ozone and is routed to the ozone disinfection tank. An alternate of the system, compresses the off-gas first and then combines it with pure oxygen stream.

A two bed desiccant type dryer should preferably be employed for the drying of the gas stream upstream of the ozone generator. A required amount of pure oxygen will be used to purge the inactive bed of the dryer.

The wastewater first flows into an oxygenation basin, whereby through the action of microorganisms in the presence of an oxygen rich gas, the organics in the wastewater are converted (oxidized) into harmless compounds. The wastewater is discharged into a settling basin, where the biomass settles to form activated sludge which is returned to the oxygenation basin. The clarified liquid from the settling basin overflows into an ozone contact tank where the ozonated gas is introduced to disinfect the water stream.

15 Claims, 6 Drawing Figures

INTEGRATED RECYCLE SYSTEM
SINGLE STAGE OXYGENATION /
OZONE DISINFECTION

FIG. 1

INTEGRATED RECYCLE SYSTEM
SINGLE STAGE OXYGENATION/
OZONE DISINFECTION

FIG. 2

INTEGRATED RECYCLED SYSTEM
TWO STAGE OXYGENATION/OZONE
DISINFECTION

OZONE DISINFECTION SYSTEM

BACKGROUND OF THE INVENTION

Municipal sewage and almost all industrial wastewater contains organic compounds in one form or other. A portion of these organics is biodegradable, i.e., the action of certain bacteria and microorganisms can decompose these organics into non-harmful compounds, namely carbon dioxide and water. In fact, the microorganisms utilize these organic compounds as food and thus, the organics are essential for the growth and reproduction of bacteria and other microorganisms. These microorganisms are aerobic in nature and oxygen is needed for survival as well as their growth.

This natural phenomenon is utilized to effect the removal of biodegradable compounds (commonly referred to as BOD) from the wastewater before it is discharged into public water streams where, if not removed, these organics would cause depletion of dissolved oxygen, a condition which would be harmful to the aquatic environment. The activated sludge process employs the above concept and is the most commonly used biological treatment method.

In conventional activated sludge processes the wastewater is aerated in a large aeration tank. For the removal of organic compounds, the aeration tank must have an adequate supply of oxygen (or air) and certain microorganisms (aerobic bacteria, protozoa). Other requirements are adequate amounts of micro-nutrients, absence of compounds toxic to bacteria and a certain dissolved oxygen level. In a nutshell, in the aeration tank, environmental conditions are maintained so as to promote the optimum growth of microorganisms and, thus, achieve maximum BOD removal.

The biological floc is suspended in the aeration tank and the tank contents are in turbulent regime to maintain the suspension. The wastewater containing suspended and dissolved organics is introduced at the inlet end where it is mixed with the returned sludge and is discharged into the tank. The tank contents, including wastewater, returned sludge and suspended biological floc are known as mixed liquor. The mixed liquor is continuously withdrawn from the tank and retention time in the tank is varied to achieve the desired treatment efficiency.

The mixed liquor is discharged into a clarifier/setting basin where the biological solids settle down to form sludge, and the clarified water overflows over the effluent weir. A portion of the sludge is returned to the aeration tank to maintain a steady concentration of BOD removing microorganisms in the aeration tank. Any excess sludge is wasted.

In conventional activated sludge, air is supplied to the tank by surface aerators or submerged diffusers. As the air contains only 20% oxygen, an enormous amount of air has to be supplied to satisfy the oxygen requirements. The primary disadvantages of an air system are large tank volumes required, lower oxygen transfer efficiency, and high oxygen consumption (per lb. of BOD removed).

In the past few years, there has been increased acceptance of pure oxygen activated sludge process. In this process, an oxygen rich gas (90%-95%) is supplied to the aeration tank rather than air. The primary advantages are improved oxygen transfer efficiency, better sludge settleability, less land area is required, lower capital and operating costs, and lower oxygen consumption (per lb. of BOD removed).

The effluent from the clarifier has some BOD, suspended solids and bacteria and it has to be disinfected ("bacteria kill") prior to discharging into the receiving stream. Chlorination is the most common mode of disinfection, however, the recent trend is towards the use of ozone for disinfection because (1) chlorination is known to produce toxic and carcinogenic compounds (chlorinated hydrocarbons), and (2) chlorine handling is hazardous.

The supply for the pure oxygen system consists of two components, the oxygen plant and the oxygen diffusion or transfer device. Except in very small plants, the oxygen has to be generated at site for improved economics. In the oxygen plant, air is compressed, liquified and separated into oxygen and nitrogen in a distillation column. The oxygen generated usually has a purity of 90% to 95%.

The next step is the transport and transfer of oxygen into the mixed liquor. Two methods of oxygen transfer are presently in the market. One "closed tank" system relies on a surface aerator or similar equipment to transfer oxygen from a closed ullage space to the mixed liquor. The other, called "open tank" system, employs a submerged (in mixed liquor) rotating diffuser or similar equipment to produce and disperse finer oxygen bubbles. Both of these systems achieve over 90% oxygen transfer efficiency.

Ozone, for the ozone disinfection system, although required in very small quantities (ozone dosage varying from 3-10 mg/l), is generated on site as it is naturally unstable and decomposes to oxygen over a period of time. The ozone system has essentially three components, (a) ozone generation; (b) ozone transport; and (c) ozone transfer to wastewater.

In almost all the commercial installations, ozone is generated by passing oxygen through a controlled corona discharge. Alternating current corona discharge is produced across two glass dielectric electrodes at potentials between 7,500-50,000 volts and 50-2,000 HZ frequency. The amount of ozone formed is directly proportional to the power dissipated in the discharge. However, 85%-95% of applied electrical energy is dissipated as heat in the discharge space. As ozone decomposes more readily at higher temperatures, this heat must be removed. Thus, all ozone generators are either air or water cooled.

Both air or oxygen can be used as feed gas and only a small amount of the feed gas is converted to ozone. In most of the commercially available generators, the conversion averages 1% for air feed and 2% for oxygen feed. With pure oxygen feed, the most efficient conversion occurs at 1.5% to 2% (least power consumed per lb. of ozone produced), however, the commercial generators can produce 4% ozone or more.

The efficiency of an ozone generator is also affected by the oxygen feed gas purity. Presence of nitrogen, carbon dioxide, etc., in the feed stream results in the slightly higher power consumption.

As the economical conversion levels are low (1.5%-2%) a large amount of carrier gas has to be used to produce the required dosage of ozone.

In a municipal sewage treatment plant, oxygen (rather than air) is invariably used to produce ozone for the reasons outlined below:

(a) The cost of oxygen production is offset by the increased conversion obtained in the ozone generator.

(b) The ozonation off-gas containing large amounts of oxygen (up to 90%) can be reused to supply the oxygen requirement of the biological treatment.

(c) As a side benefit the dissolved oxygen level of effluent is increased to meet the residual oxygen demand created by effluent BOD and COD, thus, eliminating post aeration.

Economics is foremost in the mind of all the designers and planners. It is obvious that pure oxygen shall be used for the ozone generation as higher ozone conversion is obtained, reducing the carrier gas requirement (to less than half).

High capital and operating costs associated with oxygen generation makes it logical to combine the ozone disinfection process with the pure oxygen biological treatment step. The ozone tank off-gas contains a significant amount of oxygen (up to 90%), and considering the high cost of oxygen production, it is imperative that ways be found to use this off-gas. It has been recognized by prior researchers and a few methods exist for the reuse or recycle of the off-gas.

The process proposed in this patent application utilizes a different method for the efficient utilization of the ozone tank off-gas and has significant advantages over the earlier processes.

The ozone in its oxygen carrier gas is normally introduced near the bottom of the tank using porous diffusers. Ozone is dissolved and consumed in the disinfection process. A small portion of oxygen (and other impurities) in the carrier gas is also dissolved in the water and leaves the system with the effluent. However, a major portion of the gas remains undissolved and collects in the space above the water. During its rise through the ozone tank, the carrier gas "strips" substantial quantities of nitrogen and carbon dioxide from the wastewater (upstream of the ozone tank, wastewater absorbs nitrogen on contact with atmosphere and $CO_2$ as it is released in the oxygenation basin). The stripping action is due to the fact that the oxygen enriched carrier gas has a relatively small amount of nitrogen, $CO_2$, etc., thus, the low partial pressure causes the transfer of these gases ($N_2$, $CO_2$) from the liquid to the gaseous phase. Therefore, the oxygen content of the off-gas is slightly lower than the feed gas.

As the ozone disinfection step is almost invariably accompanied by the pure oxygen activated sludge process, one of the simplest ways to utilize the off-gas would be to divert the oxygen rich off-gas to supply the requirements of the aerobic treatment process. An example of this system is McWhirther et al. U.S. Pat. No. 3,660,277. In this process the only external gas supplied is the oxygen feed to the ozone generator. It effectively uses the ozone off-gas and maintains high oxygen purity in the feed gas to the activated sludge plant. However, as the oxygen requirement of the ozonation step in a municipal sewage treatment plant is normally greater than the oxygen required in the activated sludge process, a large amount of expensive oxygen enriched gas has to be wasted. Thus, for the most commonly occurring municipal sewage, the McWhirther patent does not eliminate the oxygen wastage, it merely reduces the amount of wastage. For convenience, the McWhirther process hereinafter has been referred to as "zero recycle system".

Another alternative is to recycle the off-gas to the ozone generator for the production of more ozone. However, each time the oxygen enriched gas is recycled and then fed to ozone contact tank, it picks up nitrogen and carbon dioxide in the ozone contact tank due to the stripping action as described above. Thus, the impurities level buildup with each recycle and the buildup continues until the partial pressure of nitrogen and carbon dioxide in the feed gas is in equilibrium with the dissolved gas level in the wastewater.

Thus, if the contaminants are not removed, the oxygen content of the feed gas to the ozone generator decreases sharply, resulting in lower efficiency and increased power consumption in the ozone generation step.

It is apparent that the buildup of impurities should be limited to a reasonable level to achieve the most economical operation. This problem has been recognized by few researchers and few methods have been proposed.

Kirk U.S. Pat. No. 3,945,918 proposed a complete recycle system in which all the ozone off-gas is recycled to the ozone generator. To limit the buildup of contaminants, a provision is made to vent (purge) a portion of the recycle gas and introduce fresh make-up oxygen at the inlet to the ozone generator. However, to achieve economical oxygen purity level in the combined feed to the generator, a significant amount of recycle gas will have to be vented (wasted). Lapidot U.S. Pat. No. 3,732,163 has tried to eliminate this expensive venting (purging) of recycle gas by removing the contaminants by absorption of impurities in a cooled liquid. In the event the absorption step is not sufficient to increase oxygen purity to an economical value, a bleed valve has been provided to vent a portion of the gas.

Both of the above expedients are expensive and have no known commercial installation in existence or in design phase. For convenience, the above two processes hereinafter will be referred to as "total recycle system."

Key et al. U.S. Pat. No. 4,132,637 has dealt with this dual problem of eliminating oxygen wastage and limiting impurity buildup, two seemingly conconcurrent phenomena, in the "partial recycle system". In this process, a substantial portion of the off-gas is recycled and the rest of the off-gas is diverted to the oxygenation basin. Fresh oxygen is introduced at the inlet of both the ozone generator and the oxygenation basin to supply the remaining requirement of ozonation as well as carbonaceous BOD removal process. The performance and economics of this process are greatly affected by the recycle rate (to the ozone generator). The recommended feasible range of recycle rate is 30% to 90% and 60% recycle is recommended as optimal, by the inventors, The important and critical features of this process are:

(a) As the recycle rate increases, the impurity level in the feed gas to the ozone generator increases indicating higher power consumption. However, at higher recycle rates, the possibility of oxygen wastage diminishes.

(b) At lower recycle rates the oxygen purity (to ozone generator) increases, however, the chances of oxygen wastage also increase. As described in detail later in this application, some venting of oxygen will occur at the recommended recycle rate of 60% under some operating conditions occurring in municipal wastewater treatment, particularly in the treatment of effluent having low BOD levels combined with high ozone dosage in the ozone treatment. The BOD of primary effluent in a municipal wastewater treatment plant normally varies from 60–300 mg/l. Later discussion herein will illustrate that the partial recycle process may result in oxygen wastage if primary effluent BOD is 190 mg/l or less.

SUMMARY OF THE INVENTION

This invention is in an improved partial recycle process in which the wastage of oxygen enriched off-gas is completely eliminated under all influent conditions normally associated with municipal wastewater treatment and at the same time limiting the impurities in the gas stream to the ozone generator to reasonable levels. At the same time the equipment and operating costs are lower than in the prior "partial recycle system", especially if open tank oxygenation systems with submerged diffusers are used.

The method of this invention is employed with the pure oxygen activated sludge and ozone disinfection process in a wastewater treatment plant. Although it is primarily aimed at the municipal market, it could very well be used in an industrial plant. It deals with the distribution and supply of oxygen and oxygen enriched gas. Thus, the scheme is independent of the method employed for the transfer of oxygen (or ozonated oxygen) rich gas into the wastewater. Specifically, this process can be used with all of the commonly used gas transfer/dissolution systems.

In the oxygenation basin, two types of dissolution systems for oxygen/oxygen rich gas, called "closed tank" and "open tank" systems are commercially available and the process of this invention can be used with either of them.

First, the "closed tank" system consists of a closed tank with a ullage space above the mixed liquor. The gas is introduced in this ullage space and is transferred to the aqueous media by means of a surface aerator or similar equipment. As the new gas comes in, it displaces the depleted oxygen rich gas which is subsequently vented to the atmosphere.

The "open tank" system consists of a submerged diffuser. The gas is introduced through the submerged diffuser under pressure and most (about 90%) of the gas is dissolved in the wastewater. The remaining gas collects over the water level and is lost to the atmosphere.

In the ozone contact tank, almost all systems employ submerged porous diffusers to introduce the ozonated gas into the closed top contact tank. As explained earlier, some of the oxygen is transferred to the wastewater and the gas phase picks up nitrogen and carbon dioxide as impurities (from the wastewater). This impure gas collects in the ullage space and is drawn off for subsequent use.

The method of this invention is to be used with a conventional activated sludge process either in a municipal or industrial wastewater treatment plant. It is expected that most potential applications of this process will be in a municipal sewage treatment plant, therefore, further discussion and illustrations are limited to municipal wastewater treatment plants.

The municipal wastewater treatment plant normally consists of three sub-systems: (a) primary; (b) secondary; and (c) tertiary treatment.

The most commonly occurring pollutants in the municipal sewage (and the ones used as a yardstick for treatment efficiency) are BOD, suspended solids (SS) and ammonia or total nitrogen.

Typical municipal sewage has the following values for BOD and ammonia:

| Influent | High | Medium | Low |
|---|---|---|---|
| BOD (mg/l) | 300 | 200 | 100 |
| NH$_3$-N (mg/l) | 50 | 25 | 12 |

Primary treatment invariably consists of settling with or without flocculation to remove suspended solids and colloidal BOD. Normally 25% to 40% BOD is removed in the primary clarifier. The effluent from the primary clarifier has the following BOD characteristics:

| | Primary Effluent | | |
|---|---|---|---|
| | High | Medium | Low |
| High BOD removal (40%) in primary treatment | 180 | 120 | 60 |
| Low BOD removal (25%) in primary treatment | 225 | 150 | 75 |

Thus, the expected mean BOD level of primary effluent is 135 mg/l and the expected range is 60–225 mg/l.

Secondary treatment consists of some kind of biological treatment. Activated sludge is one of many existing methods and is the most widely used.

Tertiary treatment consists solely of disinfection or carbon adsorption, filtration, etc., upstream of disinfection. Disinfection is usually the last step in the treatment process and is used to destroy pathogenic agents such as bacteria and viruses. Although chlorine is still the most common disinfection agent used, ozone is being used in more and more new plants.

The invention of this method interfaces with the secondary (activated sludge) and tertiary (ozone disinfection) treatment steps in municipal wastewater treatment plants.

BRIEF DESCRIPTION OF THE DRAWINGS

The invention and its attributes are best understood by reference to the drawings in which.

DETAILED DESCRIPTION OF THE INVENTION

Figure 1:
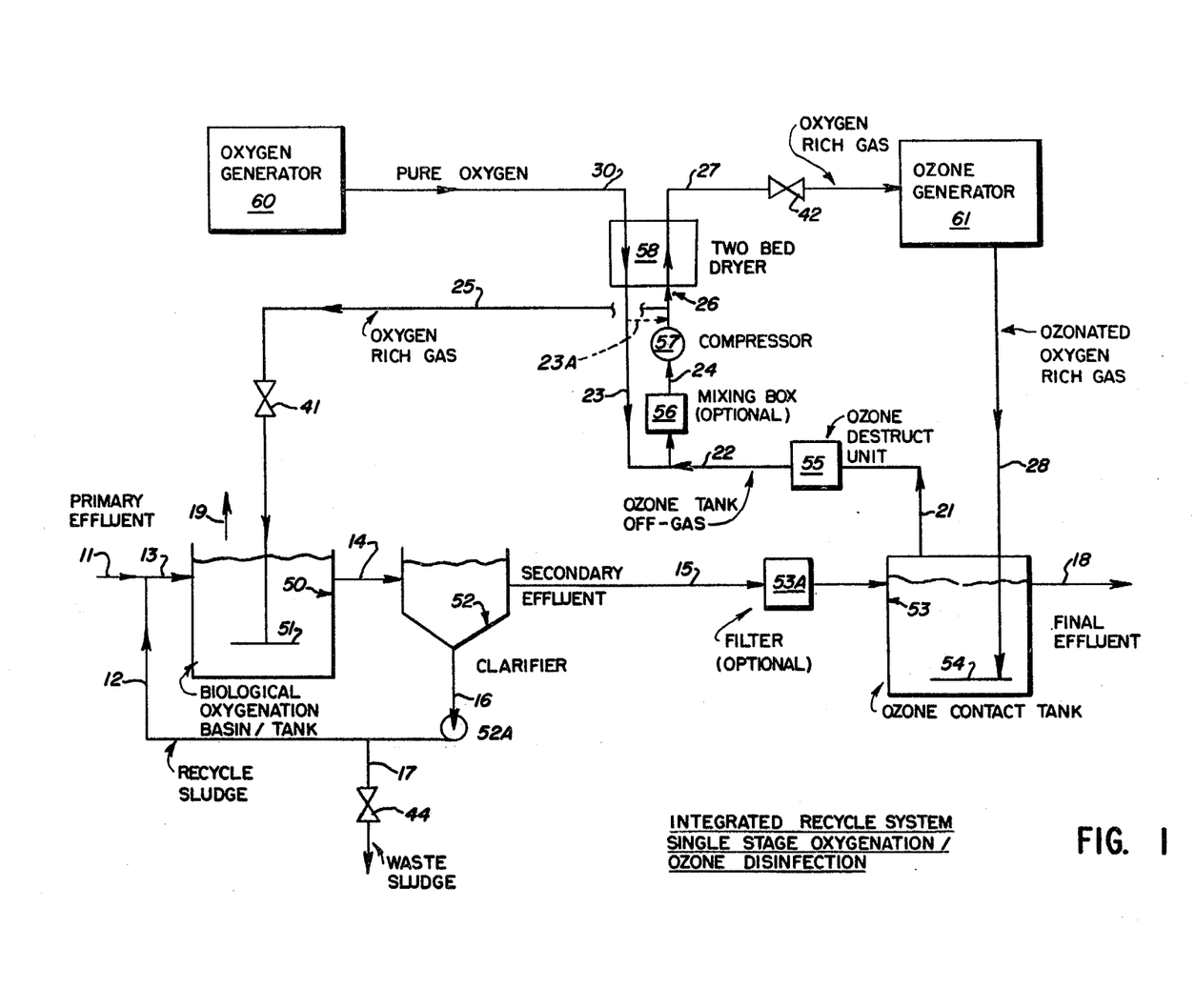
FIG. 1 is a schematic representation of the process and apparatus of one embodiment of this invention as applied to a system in which there is a single-stage oxygenation zone.

FIG. 1, as indicated above, shows the apparatus and method of this invention as applied to gas supply and distribution in a single stage carbonaceous BOD removal (or combined BOD and $NH_3$—N removal).

The primary effluent 11 (from the primary clarifier) enters a biological oxygenation basin/tank 50, where a reduction in biological oxygen demand is effected. At the inlet of the tank, the primary effluent is mixed with the return sludge 12 to maintain the required biomass population in the oxygenation tank. The mixture of primary effluent and return sludge 13 is called mixed liquor. In the oxygenation tank, oxygen enriched gas is supplied from a central compressor 57 (or from a junction point just downstream from the central compressor, as described hereinafter) through pipe 25 and submerged diffuser 51. The flow rate of the oxygen enriched gas is adjusted by valve 41 in response to the oxygen demand in tank 50. The off-gas, consisting primarily of oxygen and carbon dioxide, is vented directly to the atmosphere in open tanks or by means of vent pipe 19 in closed tanks. The mixed liquor is retained in the tank for a certain period of time while the microorganisms subdivide and grow in an aerobic environment, utilizing organics in the sewage as food. The mixed liquor then is discharged into clarifier 52 through effluent channel 14, where the biological solids settle down and the clarified effluent overflows into the ozone contact tank 53, either directly through pipe 15, or after being routed through tertiary treatment (i.e. filtration), 53A.

The sludge containing microorganisms (active biomass) collects at the bottom of the clarifier and a portion of it is recycled to the inlet of oxygenation tank by means of return sludge pump 52A and pipe 12. The return sludge ensures an adequate biomass supply for the removal of organics from the incoming wastewater. Any excess sludge is wasted through line 17.

In the closed contact tank 53, the secondary effluent is introduced near the top of the tank and a countercurrent flow is established when the ozonated gas (carrier gas) is diffused through submerged diffusers 54. The wastewater retention time in the tank varies from 10 to 30 minutes to achieve the necessary disinfection. During this process the wastewater is saturated with oxygen and the rising gas bubbles strips nitrogen and carbon dioxide from the wastewater. The effluent from the tank, with the dissolved oxygen content of over 30 mg/l, is discharged into the receiving stream through an overflow pipe 18.

The carrier gas, saturated with water vapor, consisting primarily of oxygen with small amounts of nitrogen and carbon dioxide collects in the ullage space above the water. This oxygen enriched gas is drawn off the tank through vent pipe 21.

This gas stream contains a very small portion of residual ozone. However, even in such small quantities (less than 0.5%), it is very corrosive, especially in the wet state. Also, these concentrations of ozone are very toxic and leakage of it can be a serious health hazard. It is desirable (and economical) to remove the ozone before its recycle/reuse.

Three different types of ozone destruct units can be utilized. Scrubbing of the gas stream can be employed. However, due to small concentrations of ozone and materials of construction, it is not likely to be a cost effective means. Similarly, heating of the gas stream will be uneconomical as sufficient retention time will have to be provided for complete destruction. The third method is a combination of heating and catalytic conversion and is commercially available. Here the gas stream is initially heated (to about 300° F.) and then passed over a bed of catalyst to increase the rate of ozone decomposition. The heat from the effluent gas is recovered to increase the temperature of influent stream. Thus, the net heat input is small, making the process economical. The process of this invention employs this catalytic type destruct unit for the destruction of residual ozone.

The off-gas is routed through the ozone destruct unit 55 to destroy ozone. The oxygen rich gas stream 22 is then sent to the mixing box 56, where it is combined with the pure oxygen stream 23 from oxygen generation plant 60. The mixing box is a small baffled tank to provide 5 minutes retention for blending the two gas streams. From here, the integrated gas stream 24, is introduced at the suction of a central compressor, 57.

A variation of this process is to eliminate the mixing box and to use the central compressor, 57, both for gas blending and compression. In that event, both the off-gas stream 22 and pure oxygen stream 23 are introduced and combined at the compressor suction.

Another variation of this system is when the pure oxygen stream is available at higher pressure. Then the pure oxygen stream, shown by dotted line 23A, is blended with the offgas stream downstream of the compressor.

The pure oxygen gas stream 23 (or 23A) contains enough oxygen to supply the biological treatment requirement, 25, as well as to make up for the oxygen converted to ozone and lost with the ozone contact tank effluent 18.

The central compressor 57 (or with pure oxygen stream 23A) will supply the total gas requirement of both the biological oxidation and ozone disinfection processes. The discharge pressure will be dictated by the maximum operating pressure required in the total system, which could be either feed pressure to the ozone tank or oxygenation basin, depending upon the dissolution system selected. It is an advantage of the system of the instant invention over the system described in the Key et al. patent that the instant invention requires only one compressor, rather than two.

The discharge from the compressor 57 (or combined with stream 23A) is split into two streams. The first stream 25 is sent to the oxygenation basin. The second stream 26 is diverted to the ozone generator 61 for the production of ozone. The gas to the ozone generator is to be dried to a dew point of about $-40°$ F. The moisture in the gas causes corrosion of dielectric and also accelerates the rate of ozone decomposition in the ozone generator. Therefore, the gas stream 26 is routed through a dryer 58. Two types of dryers can be used: a heatless, two cycle, desiccant type dryer (removes moisture by adsorption) and refrigerant type dryer (removes moisture by condensation). In a desiccant type dryer, the moist gas is passed over an active bed of desiccant (silica, alumina, etc.) while the inactive bed is purged (to remove the moisture) with the dry gas from the active bed or from an external source. If an external supply of dry gas is available, this dryer has low operating cost. In a refrigerant type dryer, the moisture is removed by condensation. The gas is cooled by means of refrigeration. This type of dryer is expensive and requires more maintenance. Thus, in its preferred embodiment, the process of this invention uses a two bed desiccant type dryer.

The extremely dry pure oxygen stream 30 (dew point about −290° F.) from the oxygen generation plant 60 will be utilized to purge the inactive bed of the dryer. The purge gas stream 23 (or 23A) is then combined with the ozone tank off-gas 22, either in the mixing box 56, or at the inlet of compressor 57 or at the discharge of compressor 57.

The dried gas stream 27 is ready for the feed to the ozone generator, where a portion of oxygen rich gas is converted to ozone in a high frequency/high voltage electric field. The rate of ozone production can be controlled by varying the gas flow rate by means of a control valve 42, or by varying the applied power, in response to the change in wastewater flow and/or the change in the required dosage.

The gas stream 28, containing a small percentage of ozone is then bubbled into the ozone contact tank at a predetermined depth by means of porous diffusers 54.

Figure 2:
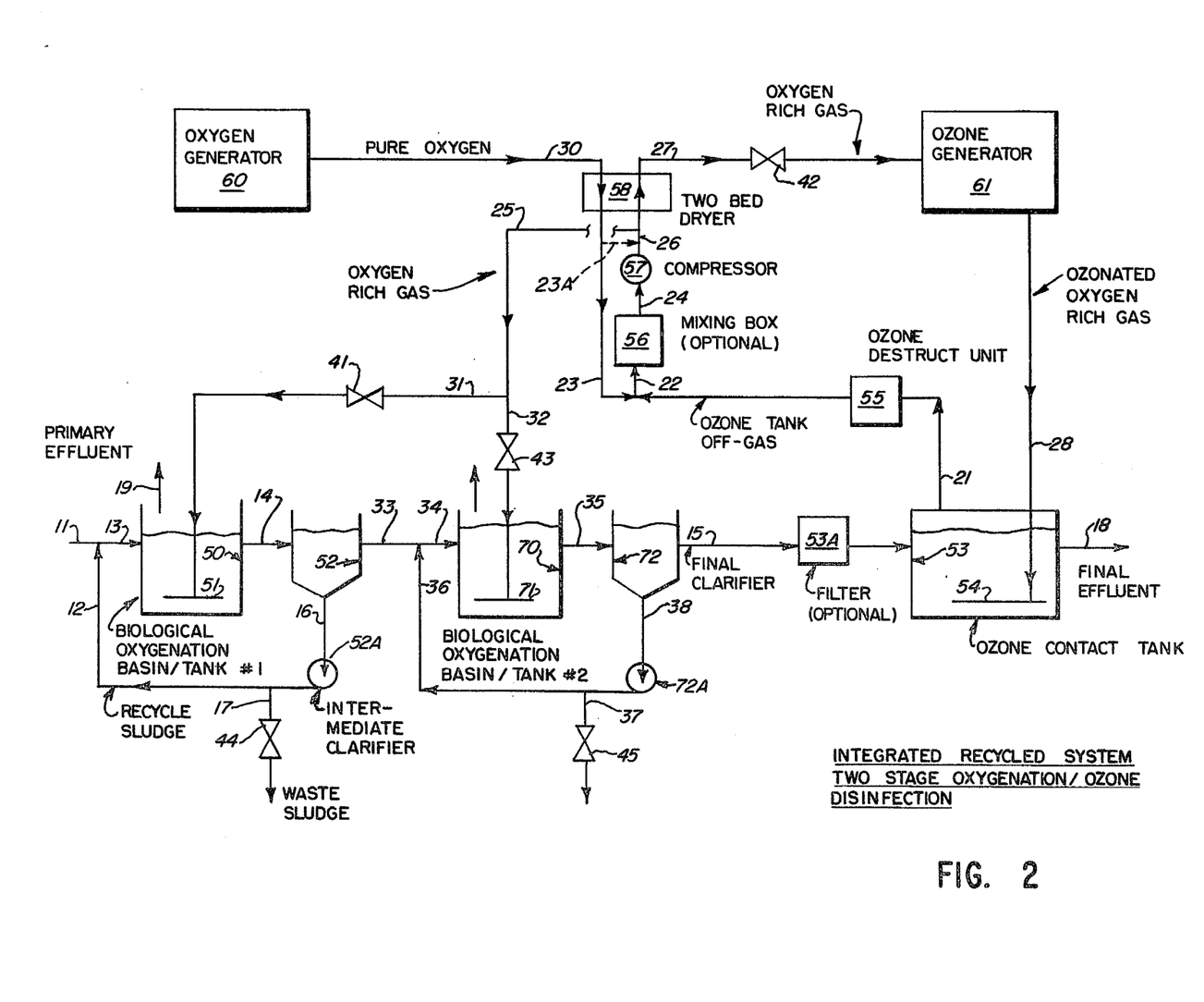
FIG. 2 is a schematic representation of the process and apparatus of another embodiment of this invention as applied to a system in which there is a two-stage oxygenation zone.

FIG. 2 illustrates the two-stage biological system which is employed to effect the carbonaceous BOD and ammonia-nitrogen removal in the two different basins. In the first basin, the majority of the BOD is removed. In the second basin, different operating conditions (low F/M ratio, long SRT, etc.) are maintained to achieve optimal growth of the "nitrifiers", the ammonia removing microorganisms. In FIG. 2, elements which correspond to those of FIG. 1 bear the same reference numerals.

The oxygen enriched gas distribution method for two stage systems of FIG. 2 is essentially the same as for the one stage system, illustrated in FIG. 1. The gas stream 25 from the compressor to the oxygenation tank is further split into two gas streams, 31 and 32, to first tank 50 and second tank 70, respectively. The gas flow to each tank is controlled by the oxygen demand in the tank by means of control valves 41 and 43. The overflow from first clarifier 52 is discharged into the second oxygenation tank, 70, where oxygen rich gas 32 is introduced by means of submerged diffusers 71. The mixed liquor from the oxygenation tank flows to second clarifier 72 by means of effluent channel 35. A portion of the settled sludge 38 is returned to the influent end of the second oxygenation tank through line 36. The rest of the sludge is wasted by means of pipe 37. Pump 72A serves both the return and wastage needs.

The clarified effluent from the second clarifier overflows to the ozone contact tank 53. A filter 53A may be installed in line 15 to the ozone contact tank.

The rest of the process is identical to the single stage system.

As discussed above, the most important criteria for the performance evaluation of any gas supply and distribution system (recycle/reuse processes) in a municipal wastewater treatment plant are:

(a) Minimum amount of oxygen wastage.

(b) High oxygen purity level in feed gas to ozone generator and oxygenation basin.

(c) Low capital and operating cost.

None of the prior art systems exhibit all the above characteristics, but at best achieve, one desirable characteristic at the expense of others.

By contrast, the method of this invention, has no oxygen wastage under all operating conditions, limits the buildup of impurities in the feed gas to the ozone generator and oxygenation basin and has low to moderate capital and operating costs.

This process is unique as there is only one pure oxygen stream, the quantity of which is controlled by the fresh oxygen requirement of both the biological and disinfection process, thus, the supply never exceeds demand and oxygen wastage never occurs. This is the single most important feature of this process and has a definite advantage over the competing systems.

In the "zero recycle system", the pure oxygen supply is controlled only by the disinfection requirement which normally exceeds the oxygen requirement of the biological system. In the "partial recycle system" of the Key et al. patent, there are two pure oxygen streams, the flow rates of which are controlled by the ozone disinfection and the biological oxidation system, respectively. However, at low influent BOD (and recommended recycle rate) combined with high ozone dosage, the Key et al. "partial recycle system" has only one pure oxygen stream to the ozone generator, which supplies the oxygen requirement of the total system and may result in the wastage of oxygen.

The uniqueness of integrated recycle process of this invention comes from the fact that both "no oxygen wastage" and "limiting impurity buildup" in the recycle gas, so far a seemingly impossible combination, are achieved at low total cost, including all operating and capital cost as well as the cost of oxygen wastage. It is accomplished by recycling all the ozone tank off-gas to the ozone generator and the oxygenation basin. However, before recycling, the off-gas is mixed with the pure oxygen from the oxygen generating plant either upstream or downstream of the compressor. The compressor discharge gas is split into two streams, one to the ozone generator and the other to the oxygenation tank. The total gas flow to ozone generator 27 is approximately the same as the ozone tank off-gas stream 22. Similarly, the gas flow stream 25 to the oxygenation tank is approximately the same as the pure oxygen stream 30.

The mixing of the two streams 22 and 23 limits the buildup of impurities to a reasonable level, as this feature makes the process an open system. A significant amount of fresh oxygen is added and a portion of this mixed stream is vented to the atmosphere in the oxygenation tanks after being stripped therein of a substantial portion of its oxygen content. A large portion of vent gas is carbon dioxide and nitrogen. Thus, this system utilizes a routine venting of gas in the oxygenation tanks as a "built in purge" in the total system. In other words, a significant amount of impurities (carbon dioxide and nitrogen) stripped in the ozone tank are vented to the atmosphere in the oxygenation tanks limiting the impurities level in the recycle system to a more economical level.

An integrated recycle system, by its very design, will not have any wastage of oxygen under all operating conditions normally experienced in municipal wastewater treatment. As compared to other recycle systems, this process has only one pure oxygen stream 30 from the oxygen generation plant, the flow of which is controlled by the oxygen requirement of both the biological and disinfection system.

The pure oxygen stream 23 serves two needs. It supplies the oxygen demand of the biological process and also serves as the make-up for the oxygen consumed in the disinfection process (difference of stream 28 and 22), which is primarily due to the oxygen lost with the effluent wastewater 18.

The oxygen requirement of the biological process is affected by influent BOD and ammonia level, influent flow rate, process parameters, i.e. F/M ratio, etc. The oxygen demand of the disinfection process is primarily affected by the variation in the hydraulic flow.

The pure oxygen stream flow is controlled by both these demands (the oxygen generator serves as unlimited oxygen source up to a design maximum), and the oxygen supply is always equivalent to the total system demand. Thus, no oxygen wastage ever occurs and significant cost savings result over prior art systems.

As the oxygen requirement for both ozone generator 61 and oxygenation basin 50 are supplied from a central point (compressor), the oxygen purity in both the streams, 25 and 26, will be the same.

A computer model has been developed to simulate the operation of an integrated partial recycle system. By varying the inputs to the model, the impact of various external and design conditions on the performance of the system can be studied. The range of operating conditions studied are described in Table 1. Only operating parameters expected to have major impact on the process performance were considered.

The impurities content of the gas stream to the ozone generator is directly affected by the influent BOD to the oxygenation basin. Higher influent BOD results in higher $CO_2$ production and higher dissolved $CO_2$ in the ozone tank wastewater. Thus, more $CO_2$ is stripped in the ozone tank and the off-gas contains a higher portion of carbon dioxide.

TABLE 1

Design Parameters
Flow: 20 mgd
Oxygen purity: 95%
Oxygen transfer efficiency: 90%
Ozone transfer efficiency: 90%
Submerged depth of ozone diffusers: 20'
BOD removal; first stage: 90% (80% if two stage)
BOD removal; second stage: 80%
Ammonia removal; first stage: 0% (90% if single stage BOD-$NH_3$-N removal)
Ammonia removal; second stage: 95%
Wastewater Characteristics
Influent ammonia: 15 mg/l
Influent BOD:  60 mg/l to 300 mg/l (total range)
               60 mg/l to 225 mg/l (expected range with primary treatment)
               135 mg/l (expected mean)
               150 mg/l (average taken for comparison with prior art)
Ozone concentration, % by weight: 1/5% to 5% (average: 2%)
Ozone dosage: 4 mg/l to 10 mg/l (average: 6 mg/l)

The composition of gas stream to the ozone generator with varying influent BOD has been calculated for a single stage carbonaceous BOD removal; two stage (first stage, BOD removal and second stage, ammonia removal) and single stage BOD and $NH_3$—N removal plant, respectively. The oxygen concentration does not exhibit large variation in the BOD range between 60 and 300 mg/l and is normally limited within 75% to 85% oxygen purity.

In a single stage BOD removal plant the oxygen purity shows a slight increase, 79% to 80.5% as BOD increases from 60 to 100 mg/l. This is due to the fact that with an increase in BOD, more fresh oxygen is added, increasing the oxygen purity. However, with BOD higher than 100 mg/l, the oxygen purity exhibits a slow and steady (and almost linear) decrease and is 75% at BOD 300 mg/l. The decrease in oxygen purity is due to higher amount of carbon dioxide generated in the biological process and subsequently transferred to the gas stream (stripped) in the ozone tank.

In a two stage plant or single stage plant for BOD and $NH_3$—N removal, the oxygen purity decreases from 85% to 73.5% and 85% to 76%, respectively, as the influent BOD changes from 60 to 300 mg/l. At low BOD, the slightly higher concentration (than single stage BOD removal only) results because of low $CO_2$ production and higher fresh oxygen requirement (due to added load by ammonia removal).

The two stage process exhibits a sharper decrease and a lower oxygen purity (73.5% at 300 mg/l BOD) as compared to a single stage process, the two stage system removes more BOD (in computer simulation 96% versus 90%) and thus, the $CO_2$ production increases.

The percent of $CO_2$ in the gas stream, 24, increases linearly with the influent BOD for all three systems from about 4% to about 18–20% as BOD increases from 60 to 300 mg/l. The percent nitrogen decreases with an increase in BOD as higher $CO_2$ in the off-gas results. The impact of influent BOD on the oxygen purity is summarized in Table 2. In the expected BOD range, the oxygen purity varies from 77% to 85%.

TABLE 2

Integrated Partial Recycle System
Oxygen Purity in Gas to Ozone Generator

| BOD | Single Stage BOD Removal | Two Stage | Single Stage BOD and $NH_3$-N Removal |
|---|---|---|---|
| Expected range (60–225 mg/l) | 80%–77% | 84–77% | 85%–79% |
| Expected mean 135 mg/l | 80% | 81.5% | 83% |

Calculations establish that the performance of integrated recycle system (as measured by the oxygen purity in the ozone generator feed gas) is independent of ozone concentration. The gas composition remains the same when the ozone concentration is varied from 1.5% to 4.0%. For illustration purposes, two computer runs were made at two different ozone concentrations, 1.5% and 2.25%, while all other parameters were maintained constant. (Flow: 20 MGD, ozone dosage: 6 mg/l, influent BOD: 150 mg/l.). The various gas flow and composition obtained at two of the operating conditions are given in Table 3. As the ozone concentration increases, a smaller quantity of feed gas to the ozone generator (27) is required, but the gas composition remains the same. In the ozone contact tank, the amount of gas transfer from the liquid to gas phase is a function of impurity ($N_2$, $CO_2$) partial pressure in the gas phase and the impurity concentration in the influent water. As the partial pressure is not affected by the change in ozone concentration and the influent characteristics are only dependent upon the upstream biological process, the amount of oxygen lost in the effluent water 18 remains the same (function of $O_2$ partial pressure only). The result is lower oxygen purity (%) in the ozone tank off-gas (22). As the amount of pure oxygen (23) remains unchanged (as biological system oxygen demand and oxygen lost with effluent remain unchanged) the ratio of the pure oxygen stream 23 and ozone tank off-gas 22 increases.

One would expect this increase to be accompanied by increase in the oxygen concentration of the combined gas stream 24. However, this potential increase in the oxygen purity is offset by the reduction in oxygen purity level of the ozone tank off-gas, as explained above. Remarkably, the net result is the same feed gas composition for all ozone concentrations studied. This is shown in Table 3.

TABLE 3

| Gas Composition and Balance at Different Ozone Concentrations | | |
|---|---|---|
| Ozone Concentration | 1.5% | 2.25% |
| Ozone Contact Tank | | |
| (a) Gas to Ozone Generator (27), lbs/day | 74133.33 | 49422.22 |
| (b) Oxygen to Ozone Generator (27), lbs/day | 58947.21 | 39289.24 |
| (c) Oxygen Partial Pressure in Feed Gas (28), atm | 1.22 | 1.22 |
| (d) Amount of $O_2$ Lost With Effluent (18), lbs/day | 7339.2 | 7339.2 |
| (e) % of $O_2$ Lost in Ozone Contact Tank, % | 12.45 | 18.68 |
| (f) % $O_2$ in Ozone Tank Off-Gas (22) | 71.73 | 67.66 |
| Gas Mixing | | |
| (g) Oxygen in Ozone Tank Off-Gas (22), lbs/day | 51608.01 | 31958.94 |
| (h) Pure Oxygen Supply (23), lbs/day | 34360.8 | 34360.8 |
| (i) Pure Oxygen/$O_2$ in Off-Gas (23/22) | .67 | 1.08 |
| (j) Total Pure Oxygen Stream (23), lbs/day | 36169.26 | 36169.26 |
| (k) Total Ozone Tank Off-Gas (22), lbs/day | 71947.04 | 47235.93 |
| (l) Total Gas to Compressor (24), lbs/day | 108116.2 | 83405.19 |
| (m) Oxygen in Compressor Feed Gas (h+g), lbs/day | 85968.81 | 66319.74 |
| (n) Oxygen Purity of Combined Gas | 79.515 | 79.515 |

Calculations establish that the oxygen content of the feed gas to the ozone generator in the practice of this invention remains constant when the ozone dosage is varied from 2 to 10 mg/l. At a BOD level of 150 mg/l and an ozone concentration of 2%, the oxygen content of the feed gas is about 79%. Although the gas flow through the generator and the contact tank varies, the oxygen purity remains the same, for the reasons explained above.

To establish the efficacy of the integrated partial recycle system, its performance has been compared with the existing recycle/reuse systems. Different computer simulation models for the various systems have been developed. The analysis and comparison of the different systems described below is based on the results obtained from these computer models.

The zero recycle system, described in McWhirther et al. U.S. Pat. No. 3,660,277, is one in which all the off-gas from the ozone tank is diverted to the oxygenation basin. Normally the off-gas is in excess of biological requirement and the only external gas supplied is to the ozone generator. Off-gas in excess of biological requirement is wasted to the atmosphere. In the event of very high BOD wastewater, the biological oxygen requirement exceeds the off-gas flow and the additional oxygen is supplied from the generator.

The total recycle system is described in Kirk U.S. Pat. No. 3,945,918 and Lapidot U.S. Pat. No. 3,732,163. Kirk's total recycle system is independent of the biological process as it returns all the off-gas to the ozone generator. To limit the contaminant build-up, provisions are made to vent a portion of the oxygen rich off-gas and introduce a make-up oxygen stream at the inlet of the generator.

Lapidot's system is basically the same as the above as it recycles all the off-gas to the ozone generator and is maintained independent of the biological process. However, it is an improvement over Kirk's system, as a portion of the impurities ($N_2$, $CO_2$) are stripped from the off-gas in a cold water stripper. Also, a provision is made to vent a portion of the off-gas, if required, to limit the impurity level in the feed gas to the ozone generator.

The partial recycle system of Key et al. U.S. Pat. No. 4,132,637 combines the oxygen requirements of the oxygenation basin and ozone disinfection. The off-gas from the ozone contact tank is divided into two streams. A variable amount, typically about 60%, is diverted to the ozone generator and the rest is sent to the oxygenation basin. The remaining requirements of both the systems are made up by the pure oxygen supply from the oxygen generator. Thus, the contaminant level in the feed gas to the ozone generator is limited as only a portion of off-gas is recycled. A fraction of $N_2$ and $CO_2$ picked up in the ozone contact tank, is vented out of the system in the oxygenation basin.

As described earlier, the amount of carbon dioxide present in the secondary effluent and later stripped in the ozone contact tank is directly proportional to the BOD removed. The only other parameter having significant impact on the impurity level is the amount of the off-gases recycled to the ozone generator. In fact, the percent of off-gas recycled to the ozone generator is the design condition which differentiates one system from another.

Figure 3:
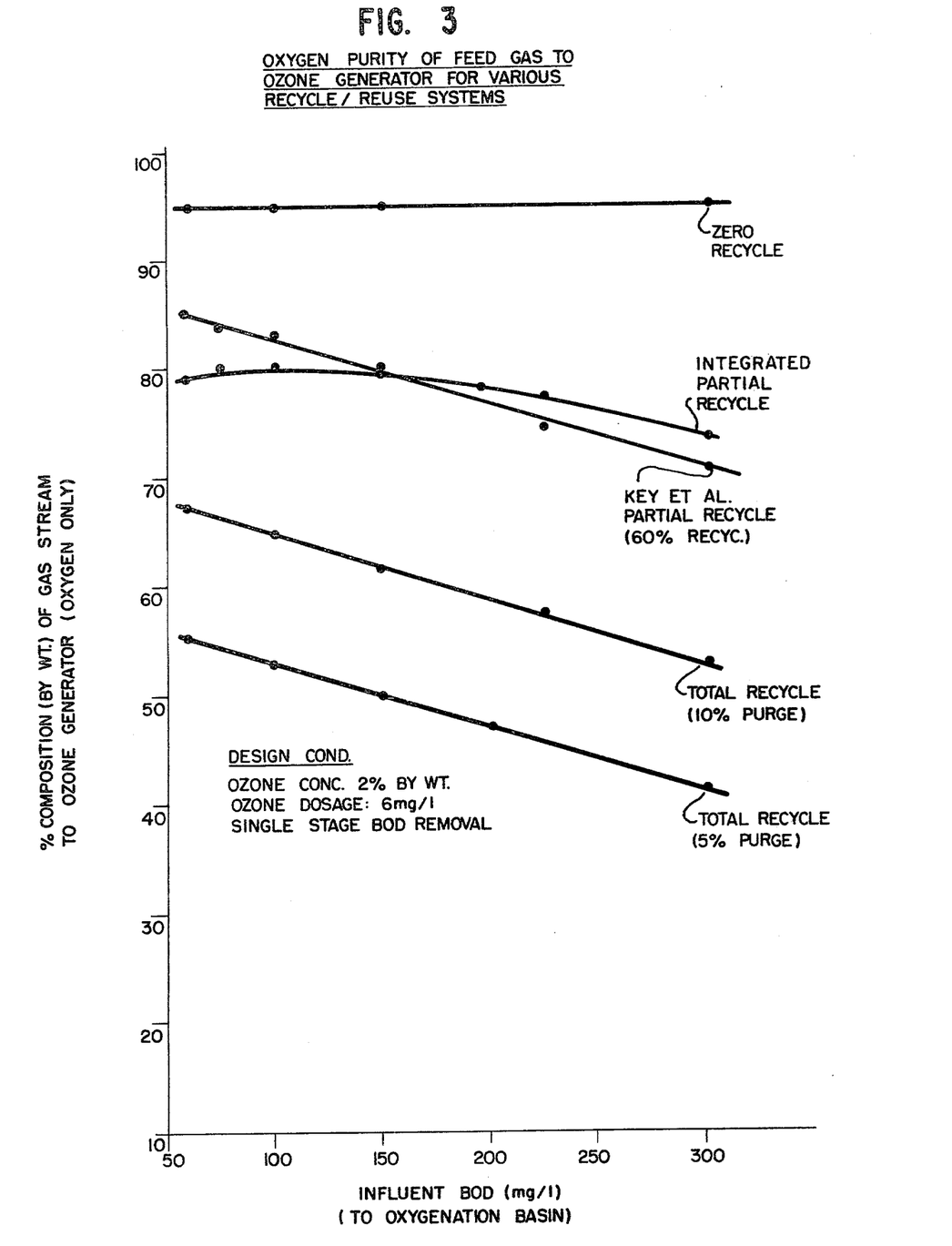
FIG. 3 shows the variation in the oxygen purity of feed gas to the ozone generator at various levels of influent BOD for the system of this invention as compared to prior art ozonation systems.
Figure 4:
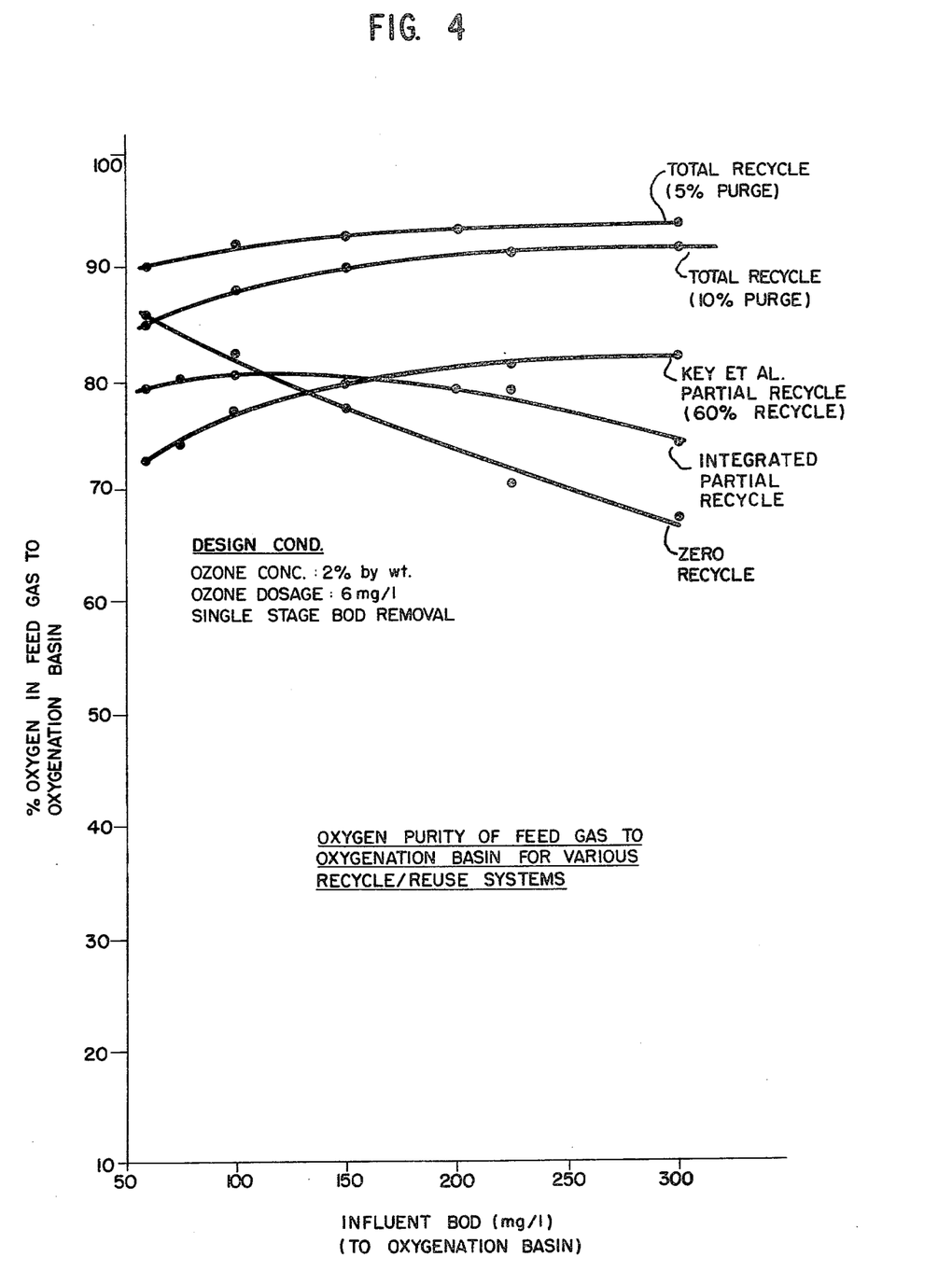
FIG. 4 shows the variation in the oxygen purity of feed gas to the oxygenation basin at various levels of influent BOD for the system of this invention as compared to prior art ozonation systems.

In FIGS. 3 and 4, the oxygen purity of feed gas to the ozone generator and the oxygenation basin (mixed liquor tank), for the various recycle/reuse system has been profiled.

As expected, the feed gas to the ozone generator in zero recycle system has the highest oxygen purity due to no recycle. Feed gas purity in the integrated partial recycle and the Key et al. partial recycle (at 60% recycle) does not differ significantly. In both cases, the oxygen purity decreases with an increase in influent BOD as more $CO_2$ is stripped at higher influent BOD levels. At average BOD level (150 mg/l in primary effluent) 80% oxygen purity is maintained. The total recycle system has the lowest oxygen purity, about 62% and 50% at 10% and 5% purge (vent), respectively.

The reverse is true for the gas stream diverted to the oxygenation basin. Total recycle system exhibits the highest oxygen concentration whereas the zero recycle system generates lowest purity stream, as illustrated in FIG. 4.

Oxygen generation requires a large capital investment and substantial power consumption. Obviously, minimizing or eliminating the wastage of oxygen in a municipal waste treatment plant is sound economics. In fact, the several recycle/reuse processes in existence utilize various means of reducing the oxygen wastage.

The process parameters affecting the oxygen wastage are, (1) influent BOD (mg/l); (2) percent ozone conversion in the ozone generator; and (3) ozone dosage (mg/l) required in the disinfection step. The first, influent BOD, determines the oxygen requirement of the biological system. The latter two dictate the amount of oxygen supplied to the ozone disinfection step and subsequently available for the biological treatment.

In the zero recycle system, all the off-gas is diverted to the oxygenation basin; any off-gas in excess of biological system requirements will be wasted. Normally, in a municipal treatment plant, the BOD of secondary influent is below 225 mg/l (see Table 1, above).

Figure 5:
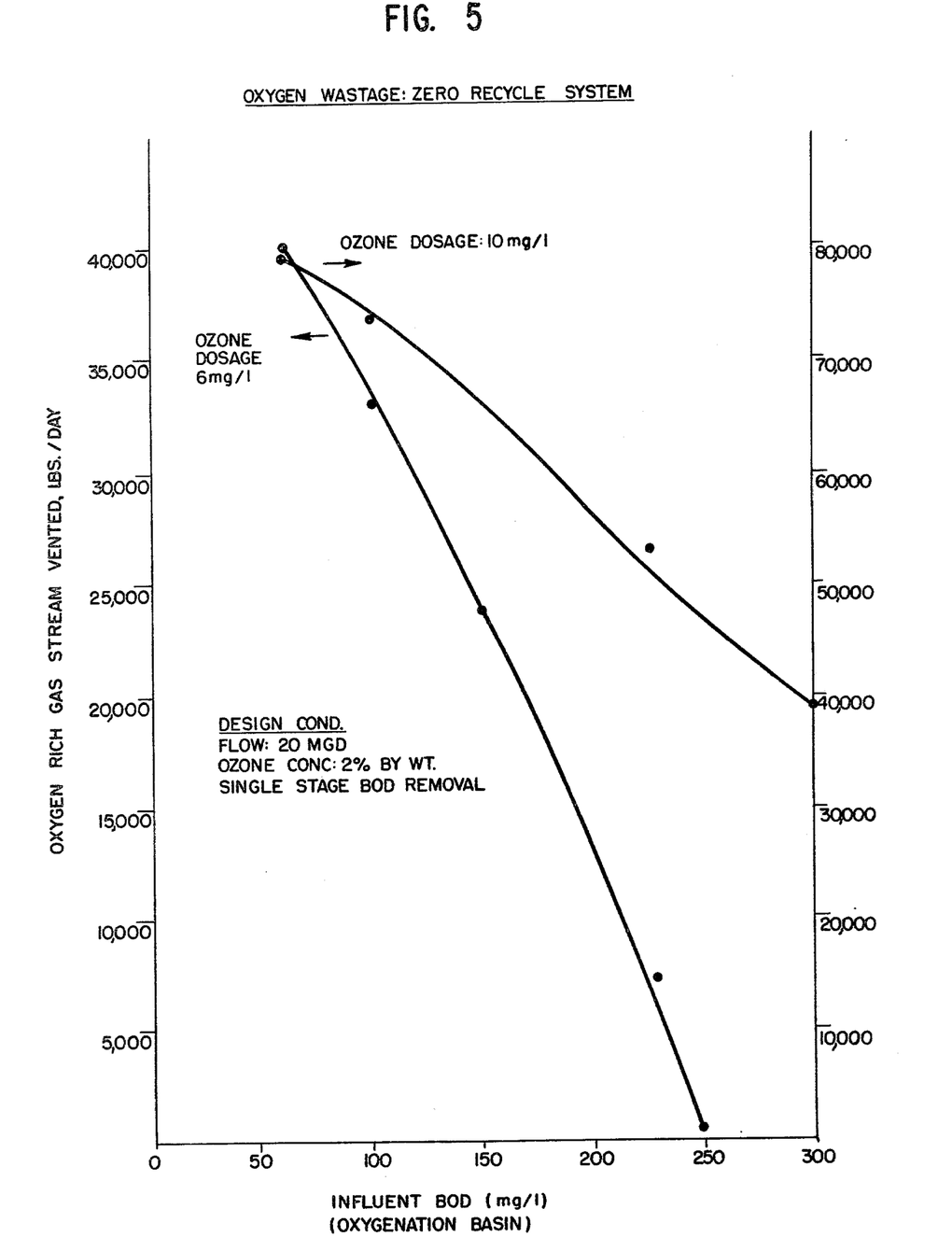
FIG. 5 shows the amount of oxygen wastage in the prior art zero recycle system at varying levels of influent BOD and at two different levels of ozone dosage.

FIG. 5 illustrates the amount of oxygen rich gas vented at various secondary influent BOD levels, both for filtered (ozone average dosage: 6 mg/l) and unfiltered (ozone average dosage: 10 mg/l) effluent. Ozone conversion is maintained at 2%. FIG. 5 shows that for filtered effluent, oxygen wastage will occur for secondary influent BOD values lower than 250 mg/l. BOD values less than 250 mg/l will occur in almost all manicipal sewage plants with or without primary treatment. For unfiltered effluent, the lower limiting concentration will be around 500 mg/l which is about the maximum limit for a typical combined municipal/industrial plants.

The oxygen wastage can be decreased by increasing the oxygen conversion in the ozone generator, but can only be achieved at increased power consumption. It is anticipated that to eliminate oxygen wastage in zero recycle system for the secondary effluent BOD level of 100 mg/l, ozone conversion will have to be over 7%, approximately doubling the power consumption (from 2%).

In the total recycle system all the off-gas is recycled with the exception of the portion vented to limit the contaminant buildup. Thus, the oxygen wastage is limited to the amount of vent gas. Assuming vent gas is normally 10%, the amount of oxygen wastage for a single stage BOD removal plant at a flow of 20 million gallons/day remains constant at BOD levels from 100 to 300 mg/l, at a level of about 5000 lbs/day at an ozone concentration of 2% and an ozone dosage of 6 mg/l, at a level of about 6900 lbs/day at an ozone concentration of 1.5% at the same ozone dosage. At an ozone dosage of 10 mg/l, the oxygen wastage is about 8750 lbs/day at an ozone concentration of 2% and about 11250 lbs/day at an ozone concentration of 1.5%.

Figure 6:
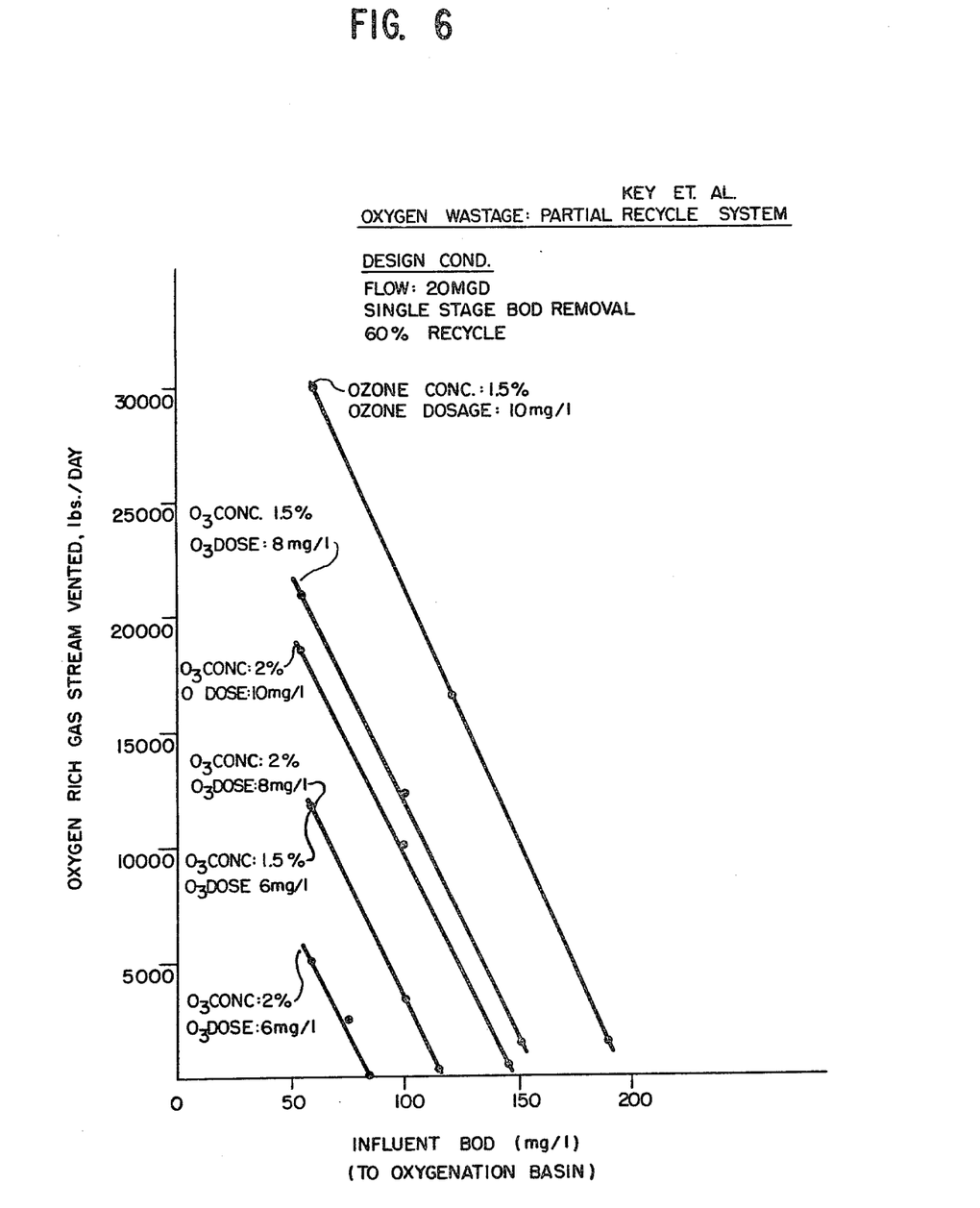
FIG. 6 shows the oxygen wastage in the Key et al. partial recycle system at varying levels of influent BOD and at varying levels of ozone concentration and ozone dosage.

Although the Key et al. partial recycle system reduces the amount of oxygen wastage, it does not completely eliminate the venting of oxygen under all operating conditions encountered in municipal wastewater treatment. FIG. 6 shows operating conditions at which wastage of oxygen occurs in the Key et al. partial recycle system. The recycle percent is maintained at 60%, the "optimal" operating point. The data shown in FIG. 6 shows that at 6 mg/l ozone dosage, the wastage will occur at secondary influent BOD lower than 85 mg/l and 115 mg/l at 2% and 1.5% ozone percentage conversion, respectively. The data also show that at 8 mg/l ozone dosage, the limiting secondary influent BOD values are 115 mg/l and 155 mg/l at 2% and 1.5% ozone conversion, respectively. It may also be seen that at 10 mg/l ozone dosage, the plant can be run at secondary influent BOD's as low as 145 mg/l and 190 mg/l at 2% and 1.5% ozone conversion without any oxygen wastage.

In contrast, the integrated recycle system of the instant application has no oxygen wastage under all operating conditions. In this process, there is only one pure oxygen stream, the amount of which is controlled by the total system oxygen demand (biological and disinfection). Thus, when the influent BOD decreases, the pure oxygen feed automatically decreases, eliminating any change of oxygen wastage. Similarly, the increase in hydraulic flow increases the disinfection demand and the pure oxygen flow increases to match the demand.

What is claimed is:

1. In a process for the treatment of aqueous waste material in which said aqueous waste material is first flowed through an oxygen-assisted activated sludge zone in which said waste material is contacted with a first oxygen-enriched gas and liquid effluent from said sludge zone is flowed through an ozonation zone in which said effluent is contacted with an ozone containing gas, in which process said ozone-containing gas is produced in an ozone generation zone by the conversion to ozone of a portion of the oxygen in a second oxygen-enriched gas and said second oxygen-enriched gas is derived in part from a gaseous effluent from said ozonation zone, and in which process an oxygen rich gas from an external source is supplied to the process to meet oxygen requirements of the process, the improvement wherein said first oxygen-enriched gas and said second oxygen-enriched gas are derived from a single stream of gas which stream comprises a combination of substantially all of the gaseous effluent from said ozonation step and substantially all of said oxygen-rich gas from said external source and wherein the flow of said first oxygen-enriched gas is controlled in response to the oxygen requirement of said oxygen-assisted activated sludge zone and the flow of said second oxygen-enriched gas is controlled in response to the oxygen requirement of said ozonation zone.

2. The process of claim 1 wherein said gaseous effluent from said ozonation step and said oxygen-rich gas from said external source are combined in a low pressure zone on the suction side of a compressor.

3. The process of claim 1 wherein said gaseous effluent from said ozonation step and said oxygen-rich gas from said external source are combined in a high pressure zone on the discharge side of a compressor.

4. The process of claim 1, 2 or 3 wherein said gaseous effluent from said ozonation step is rendered substantially ozone-free prior to being combined with said oxygen-rich gas from said external source.

5. The process of claim 2 wherein said combined stream is split on the discharge side of said compressor into at least two streams, and wherein one of said last-named streams is dried and thereafter passed to said ozone generation step as said second oxygen-enriched gas while the other of said last-named streams is passed to said oxygen-assisted activated sludge zone as said first oxygen-enriched gas.

6. The process of claim 5 wherein a multibed drying zone is maintained, wherein said stream passed to said ozone generation step flows through a first bed of said drying zone to be dried therein, wherein said oxygen-rich gas from said external source flows through a second bed of said drying zone to regenerate said second bed, and wherein said flows are periodically reversed so that said stream passed to said ozone regeneration step flows through said second bed and said oxygen-rich gas from said external source flows through said first bed.

7. The process of claim 1, 2 or 3 wherein the flow of said first oxygen-enriched gas to said oxygen-assisted activated sludge zone and the flow of said second oxygen-enriched gas to said ozone generation zone are separately controlled by separate pressure regulating valves.

8. The process of claim 1, 2 or 3 wherein the power input to the said ozone generation zone is controlled in response to the ozone demand in the said ozonation zone.

9. The process of claim 1, 2 or 3 wherein said oxygen-assisted activated sludge zone comprises a single stage zone for the removal of carbonaceous BOD.

10. The process of claim 1, 2 or 3 wherein said oxygen-assisted activated sludge zone comprises a single stage zone for the removal of carbonaceous BOD and for nitrification.

11. The process of claim 1, 2 or 3 wherein said oxygen-assisted activated sludge zone comprises a two-stage zone consisting of a first stage for the removal of carbonaceous BOD and a second stage for nitrification.

12. In an apparatus for treating aqueous waste material comprising an oxygen treatment tank having a liquid inlet for aqueous influent and a liquid outlet for a treated liquid effluent and having a means for introducing an oxygen enriched gas thereto, an ozone contact tank having a liquid inlet and a liquid outlet and conduit means for passing said treated liquid effluent from said oxygen treatment tank to said inlet of said ozone treatment tank, an ozone generator having a gas inlet and a gas outlet, conduit means for passing gas from said ozone generator to said ozone treatment tank, conduit means for with-drawing a gaseous effluent from said ozone treatment tank, conduit means for supplying fresh oxygen-rich gas from an external source to said oxygen treatment tank and to said ozone generator the improvement wherein said conduit means for withdrawing a gaseous effluent from said ozone treatment tank and said conduit means for supplying fresh oxygen-rich gas from an external source to said oxygen treatment tank and to said ozone generator are merged at a juncture, constitute the same conduit means for a portion of the length of each of them and are separated at a fork and wherein said apparatus includes means to control the flow of said oxygen enriched gas to said oxygen treatment tank in response to the oxygen requirement in said oxygen treatment tank and means to control flow of said oxygen enriched gas to said ozone generator in response to the oxygen requirement in said ozone treatment tank.

13. The apparatus of claim 12 wherein said juncture is downstream of a compressor.

14. The apparatus of claim 12 wherein said juncture is upstream of a compressor.

15. The apparatus of claim 12, 13 or 14 wherein said conduit means for supplying fresh oxygen-rich gas to said ozone generator includes a dryer between said fork and said ozone generator.

* * * * *